(12) United States Patent
Hua et al.

(10) Patent No.: US 8,019,073 B2
(45) Date of Patent: Sep. 13, 2011

(54) SYSTEMS AND METHODS FOR IMPLEMENTING SPLIT NUMBERING PLAN AREA CODES IN AN IMS NETWORK

(75) Inventors: Suzann Hua, Lisle, IL (US); Ahmed N. Zaki, Lisle, IL (US)

(73) Assignee: Alcatel Lucent, Paris (FR)

( * ) Notice: Subject to any disclaimer, the term of this patent is extended or adjusted under 35 U.S.C. 154(b) by 1263 days.

(21) Appl. No.: 11/554,438

(22) Filed: Oct. 30, 2006

(65) Prior Publication Data

US 2008/0101582 A1   May 1, 2008

(51) Int. Cl.
*H04M 7/00* (2006.01)
(52) U.S. Cl. ............... 379/221.01; 379/221.13
(58) Field of Classification Search ............ 379/221.01, 379/221.13, 211.02; 455/432.1, 433, 436–444
See application file for complete search history.

(56) References Cited

U.S. PATENT DOCUMENTS

| | | | |
|---|---|---|---|
| 6,788,676 B2* | 9/2004 | Partanen et al. ............. 370/352 |
| 7,773,983 B2* | 8/2010 | Takeda ........................... 455/420 |
| 7,787,878 B2* | 8/2010 | Li et al. ...................... 455/432.1 |
| 2003/0058855 A1* | 3/2003 | Feyerabend et al. .......... 370/389 |
| 2005/0020259 A1* | 1/2005 | Herrero ......................... 455/433 |
| 2005/0131989 A1* | 6/2005 | Beckmann et al. ........... 709/201 |
| 2005/0136926 A1* | 6/2005 | Tammi et al. ............... 455/435.1 |
| 2006/0030320 A1* | 2/2006 | Tammi et al. ............... 455/435.2 |
| 2006/0077965 A1* | 4/2006 | Garcia-Martin et al. ..... 370/352 |
| 2006/0121899 A1* | 6/2006 | Willey et al. ................ 455/435.1 |
| 2007/0060097 A1* | 3/2007 | Edge et al. .................. 455/404.1 |
| 2007/0195805 A1* | 8/2007 | Lindgren ...................... 370/401 |
| 2008/0003957 A1* | 1/2008 | Schwagmann et al. ......... 455/91 |
| 2008/0069037 A1* | 3/2008 | Zhang et al. .................. 370/328 |
| 2008/0089486 A1* | 4/2008 | Madour et al. .................. 379/45 |
| 2008/0104696 A1* | 5/2008 | Ll et al. .......................... 726/21 |
| 2008/0176538 A1* | 7/2008 | Terrill et al. ............... 455/414.1 |
| 2008/0261592 A1* | 10/2008 | Finizole et al. ............ 455/435.1 |
| 2008/0274736 A1* | 11/2008 | Hu ................................ 455/433 |
| 2009/0298500 A1* | 12/2009 | Beckmann et al. ........ 455/435.1 |

* cited by examiner

*Primary Examiner* — William Deane, Jr.
(74) *Attorney, Agent, or Firm* — Duft Bornsen & Fishman LLP

(57) ABSTRACT

Systems and methods are disclosed for implementing a split numbering plan area code in an IMS network. The IMS network comprises a subscriber server adapted to store a new phone number including a new area code for a subscriber assigned as a result of the split numbering plan area code. The IMS network further comprises a call control system coupled to the subscriber server adapted to register user equipment of the subscriber assigned the new phone number with the subscriber server. The call control system is further adapted to associate an old phone number of the subscriber used prior to the split numbering plan area code with the new phone number in an implicit registration set. The call control system is further adapted to receive a call for the old phone number and identify the new phone number associated with the old phone number in the implicit registration set and to deliver the call to the user equipment.

20 Claims, 4 Drawing Sheets

SYSTEMS AND METHODS FOR IMPLEMENTING SPLIT NUMBERING PLAN AREA CODES IN AN IMS NETWORK

BACKGROUND

1. Field of the Invention

The invention relates generally to the field of communications, and particularly to methods and systems for implementing split numbering plan area codes in an IP Multimedia System (IMS) network.

2. Statement of the Problem

The growing number of subscribers and user equipment, such as land line telephones, fax machines and mobile phones has created phone number shortages in many area codes. An area code has a limited number of available phone numbers, and as the available number of phone numbers in an area code decreases, a new area code is needed to provide additional phone numbers for new subscribers.

When new area codes are created, it often becomes necessary to assign new phone numbers to existing subscribers when an existing area code is split into multiple area codes. Typically, the subscriber is assigned a new phone number corresponding to the subscriber's previous phone number with a new area code. For example, if the number of subscribers to be supported in area code "xxx" grows, the operator of the network can split the area into two area codes, such as "xxx" and "xx1". The subset of existing subscribers for which the area code has changed will actually get a new phone number. For example, a subscriber with phone number xxx-ABC-DEFG will change to xx1-ABC-DEFG. Subscribers are given a grace period, which is mandated by the FCC, during which callers can either use the old or new phone number to access the subscriber. After the grace period ends, the subscriber can only be accessed using the new phone number.

In existing cellular networks, the home location register (HLR) maintains area code translation tables. The translation tables translate old phone numbers used by subscribers before the area code split into new phone numbers used by subscribers after the area code split. Thus, calls to the old phone numbers can be delivered to the new phone numbers. During the grace period, callers can dial the old phone number to access the subscriber. For example, in a wireless network, when the call arrives at the HLR, the HLR determines that the called phone number is not an active phone number. However, before declining the call delivery, the HLR looks up the called phone number in the numbering plan area code (NPA) translation table. If a matching phone number for the called phone number is found, the called number is translated to the corresponding new phone number, and the call delivery continues.

One problem with NPA translation tables is that they require additional software and set-up time for the HLR or switching center. Additionally, the NPA translation tables need to be removed from the HLR or switching center after the grace period is over. Unfortunately, current telephone network technology does not allow NPA splits without the use of translation tables.

SUMMARY OF THE SOLUTION

The invention solves the above problems and other problems with systems and methods for implementing split numbering plan area codes in an IMS network using an implicit registration set (IRS). An implicit registration set is a group of public user identities, such as telephone numbers, that are assigned to the same user device (e.g. a telephone). Thus, the telephone may be reached through multiple telephone numbers. Advantageously, network operators may implement a split numbering plan area code without the use of translation tables. Thus, the IMS network does not require additional software when a split numbering plan area code is implemented.

One embodiment of the invention is an IMS network implementing a split numbering plan area code. The IMS network comprises a Home Subscriber Server (HSS) that stores a new phone number including a new area code for a subscriber assigned as a result of the split numbering plan area code, together with the old phone number in the same implicit registration set. The IMS network further comprises a call control system that communicates with the HSS to register user equipment of the subscriber assigned the new phone number with the subscriber server. The call control system can register all public identities of an implicit registration set, which contains an old phone number of the subscriber used prior to the split numbering plan area code and the new phone number with the new area code. The call control system can handle a call identified with either the old phone number or the new phone number to deliver the call to the user equipment (UE), since both the old phone number and the new phone number are registered for the same user or through an implicit registration set.

Another embodiment of the invention is an IMS network implementing a split numbering plan area code. The IMS network comprises a subscriber server adapted to store an old phone number and a private user ID for the subscriber. The old phone number includes an old area code used prior to the split numbering plan area code and the private user ID corresponds to a user identity of the subscriber assigned by the IMS network for identifying user equipment of the subscriber to the IMS network. The subscriber server is further adapted to store a new phone number for the subscriber assigned to the user equipment. The new phone number includes a new area code for the subscriber assigned as a result of the split numbering plan area code, and the new phone number is associated with the old phone number and the private user ID in an implicit registration set. The IMS network further comprises a call control system adapted to register the user equipment and associate the implicit registration set with the call control system on the subscriber server, and further adapted to receive a call for the old phone number and identify the new phone number associated with the old phone number in the implicit registration set and to deliver the call to the user equipment.

Another embodiment of the invention is a method for implementing a split numbering plan area code on an IMS network. The method to implement the split numbering plan comprises adding a new phone number including a new area code for a subscriber as a result of the split numbering plan area code. The method further comprises associating an old phone number of the subscriber used prior to the split numbering plan area code with the new phone number in an implicit registration set at the beginning of the grace period. As a result, both the old phone number and the new phone number will be registered together via implicit registration. Therefore a call/session identified with either the old phone number or the new phone number can be delivered to the user or UE during the NPA splitting grace period. The method also comprises assigning the same service profile for both the old phone number and the new phone number, therefore the user or UE will experience the same services during the NPA splitting grace period. The method further comprises deleting the old number for the user after the end of NPA split grace period. Such deleting or adding phone numbers for an IMS user doesn't need new HSS software or a new serving CSCF (Call Session Control Function).

The invention may include other exemplary embodiments described below.

DESCRIPTION OF THE DRAWINGS

The same reference number represents the same or similar element on all drawings.

DETAILED DESCRIPTION OF THE INVENTION

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
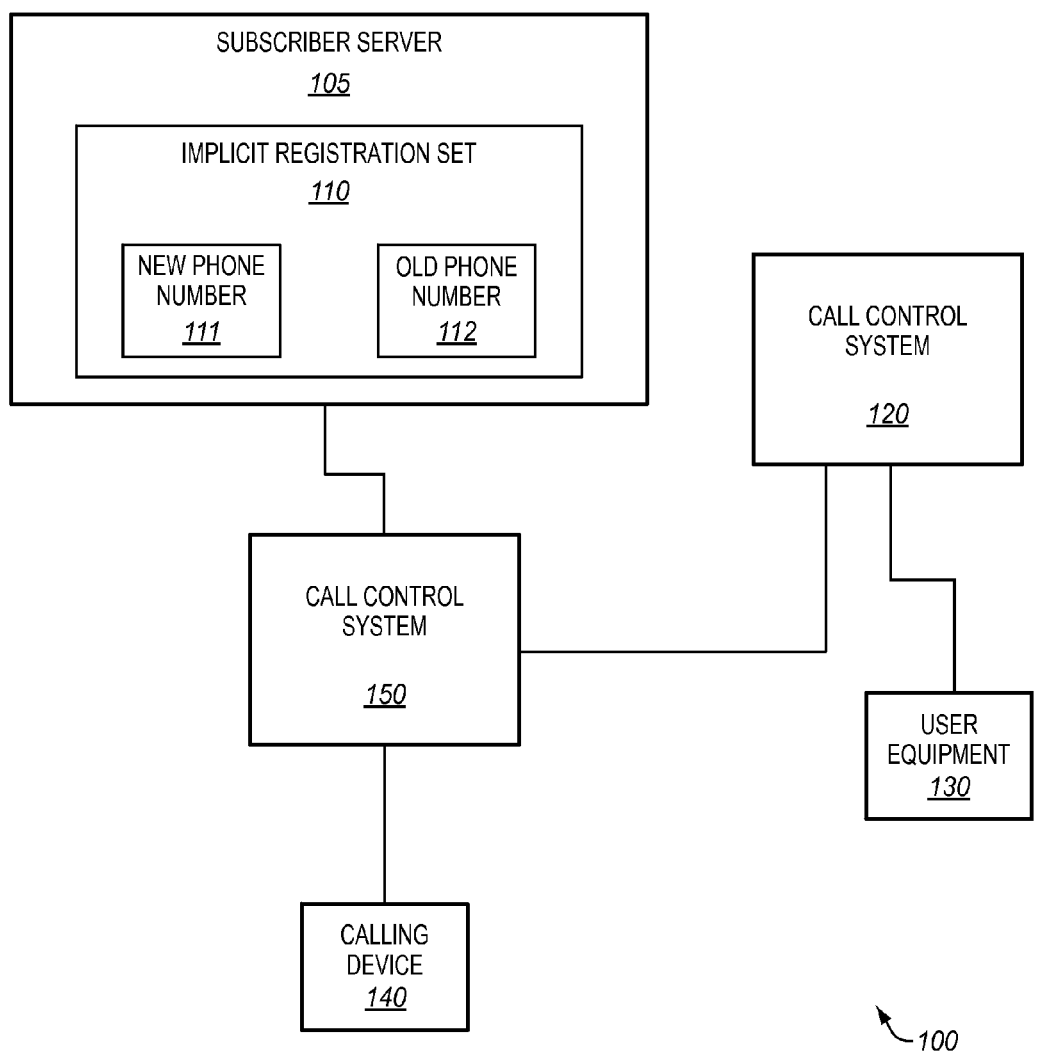
FIG. 1 illustrates an IMS network implementing a split numbering plan area code in an exemplary embodiment of the invention.

FIG. 1 illustrates an IP Multimedia Subsystem (IMS) network 100 in an exemplary embodiment of the invention. IMS network 100 comprises a subscriber server 105 and a call control system 120. IMS network 100 may further comprise additional call control systems, such as call control system 150. Subscriber server 105 stores subscriber and service-related data of IMS network 100. The data stored in subscriber server 105 includes user identities, registration information, access parameters, service-triggering information, etc. Subscriber server 105 may store and provide information about the network location of a subscriber. A user identity may comprise a public user identity (e.g. a telephone number) that other users may use for requesting communication with user equipment 130. User equipment 130 may be for example, a telephone. In the IMS standards, phone numbers are implemented as IP Multimedia Public Identities (IMPU). The IMPU is not necessarily a phone number, but a uniform resource identifier used to reach user equipment 130. For example, an IMPU may be a phone number xxx-ABC-DEFG, an email address jdoe@domain1, etc. The IMPU may not be unique to user equipment 130. Also, user equipment can have multiple telephone numbers, or IMPU's, e.g. a subscriber may have a personal and work phone number.

Call control system 120 connects user equipment 130 to other components of IMS network 100, and serves an IMS session in some fashion. For example, call control system 120 may be a call session control function (CSCF), as defined by the 3GPP IMS standards. IMS network 100 may include other components, devices or systems not shown in FIG. 1.

When user equipment 130 first connects to IMS network 100, call control system 120 registers user equipment 130 with subscriber server 105. Subscriber server 105 maintains a record storing the call control system 120 serving user equipment 130. Thereafter, if a calling device 140 attempts to place a call to the phone number assigned to user equipment 130, then call control system 150 serving calling device 140 contacts subscriber server 105 to determine the identity of call control system 120 serving user equipment 130. The call is then directed from call control system 150 to call control system 120, and call control system 120 extends the call to user equipment 130.

According to features and aspects herein, IMS network 100 has been modified using the implicit registration functionality of IMS to implement a split numbering plan area code on IMS network 100 without the use of translation tables. Implicit registration allows user equipment 130 to be accessed through multiple IMPUs or phone numbers, which are associated together in an implicit registration set 110. A call to any IMPU or phone number in implicit registration set 110 is extended from calling device 140 to user equipment 130. Assume for example that IMS network 100 implements a split numbering plan area code.

Figure 2:
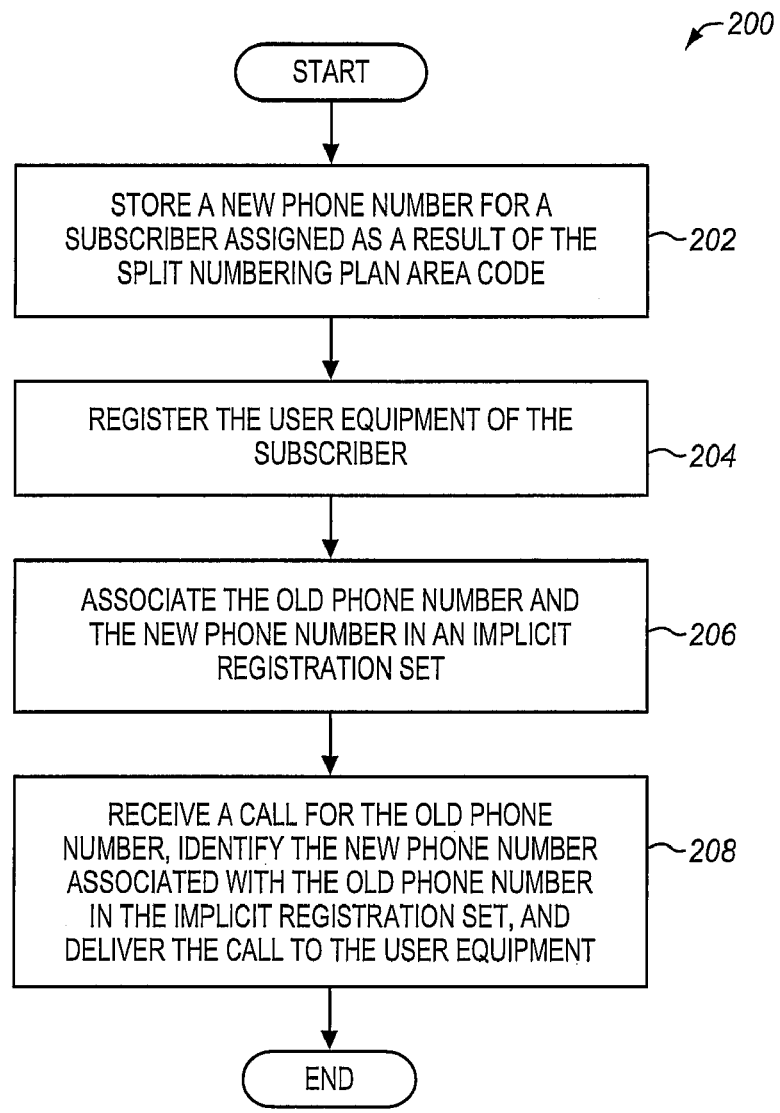
FIG. 2 illustrates a method of operating an IMS network implementing a split numbering plan area code in an exemplary embodiment of the invention.

FIG. 2 illustrates a method 200 for implementing a split numbering plan area code in an IMS network in an exemplary embodiment of the invention. The steps of method 200 will be described with reference to IMS network 100 illustrated in FIG. 1. The steps of method 200 are not all inclusive, and may include other steps not shown.

In step 202, subscriber server 105 stores a new phone number 111 including a new area code for a subscriber. New phone number 111 is assigned to user equipment 130 of the subscriber as a result of the split numbering plan area code. For example, if the subscriber previously used the phone number xxx-ABC-DEFG, and the new area code is xx1, then new phone number 111 would be xx1-ABC-DEFG.

In step 204, call control system 120 registers user equipment 130 of the subscriber assigned new phone number 111 with subscriber server 105. Registration may comprise authenticating user equipment 130 to subscriber server 105. Registration may further comprise storing the network location of user equipment 130 on subscriber server 105, such as an IP address of user equipment 130 or the call control system 120 serving user equipment 130.

In step 206, call control system 120 associates old phone number 112 of the subscriber used prior to the split numbering plan area code and new phone number 111 of user equipment 130 in implicit registration set 110. An implicit registration set associates two or more phone numbers with the same user equipment. Subscriber server 105 notifies call control system 120 of the old phone number 112 for user equipment 130 when new phone number 111 is registered. Thus, calls for both old phone number 112 and new phone number 111 may be delivered to the user equipment 130.

In step 208, call control system 120 receives a call for old phone number 112, identifies new phone number 111 associated with old phone number 112 in implicit registration set 110, and delivers the call to user equipment 130. Thus, a call for old phone number 112 or new phone number 111 may be delivered to user equipment 130 in the same manner without the use of a translation table.

An example is provided to illustrate the operation of method 200. A subscriber is assigned a new phone number 111 (xx1-ABC-DEFG) for user equipment 130. Prior to a split numbering plan area code, user equipment 130 was assigned old phone number 112 (xxx-ABC-DEFG). Call control system 120 registers user equipment 130 with IMS network 100, and subscriber server 105 stores in a record for the subscriber the call control system 120 presently serving user equipment 130. Call control system 120 serving user equipment 130 updates subscriber server 105 for all phone numbers in implicit registration set 110 associated with user equipment 130. Thereafter, calling device 140, presently served by call control system 150, places a call to old phone number 112. Call control system 150 contacts subscriber server 105 for the network location of old phone number 112. Subscriber server 105 responds with the network location or identity of call control system 120 presently serving user equipment 130. Call control system 150 connects with call control system 120, and call control system 120 delivers the call to user equipment 130.

Figure 3:
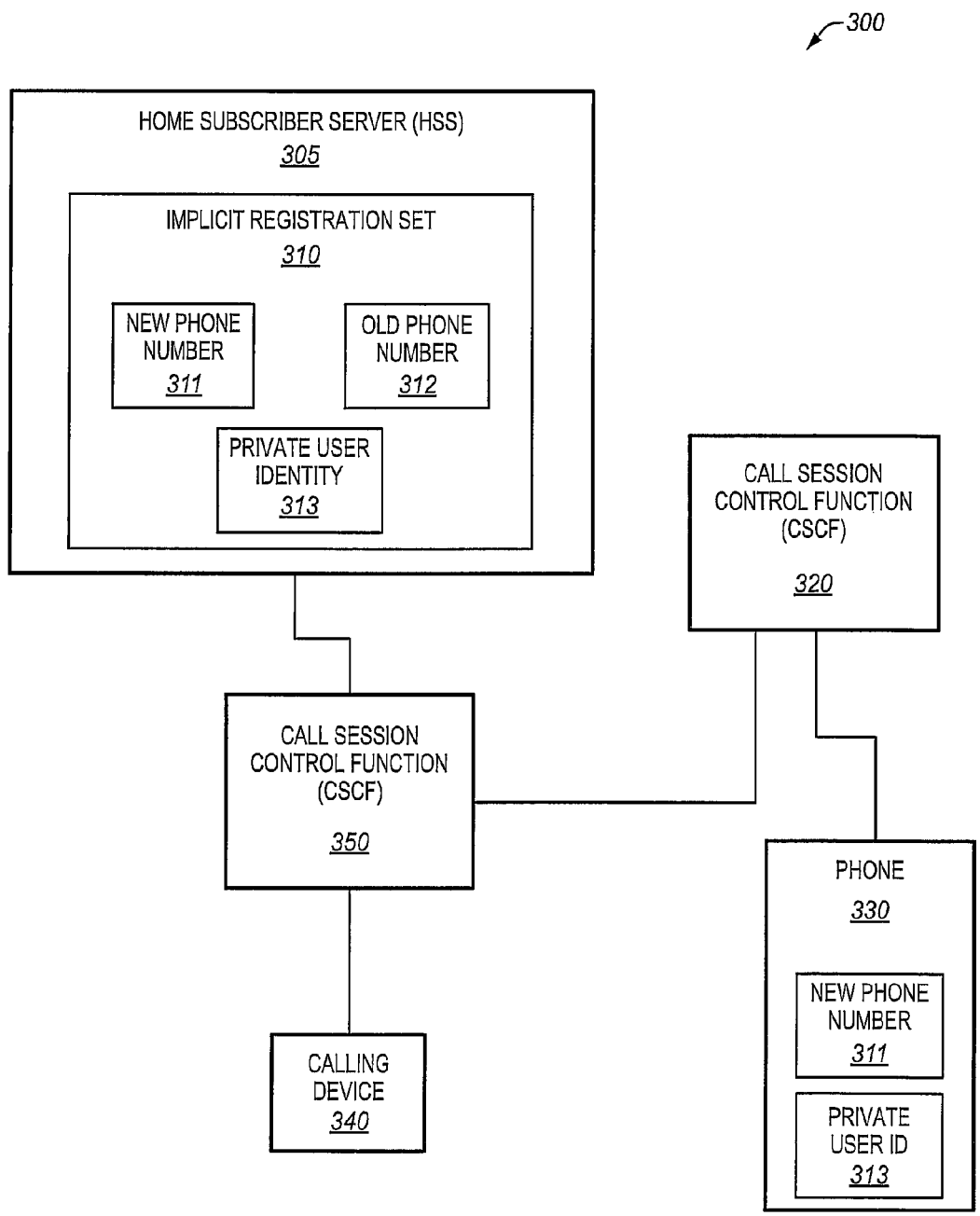
FIG. 3 illustrates an IMS network implementing a split numbering plan area code in another exemplary embodiment of the invention.

FIG. 3 illustrates an IMS network 300 in an exemplary embodiment of the invention. IMS network 300 comprises an HSS 305 and a CSCF 320. IMS network 300 may further comprise additional CSCFs, such as CSCF 350. HSS 305 stores subscriber and service-related data of IMS network 300. The data stored in HSS 305 includes user identities, registration information, access parameters, service-triggering information, network locations of a phone 330 for a subscriber, etc.

A user identity may include a private user ID and a public user ID. Private user ID 313 is a user identity that is assigned by the home network operator and is used for such purposes as registration and authorization, while a public user ID is the identity (e.g. phone number) that other users can use for requesting communication with a phone 330. The IP Multimedia Private Identity (IMPI) is unique for each phone 330 or user equipment. In the IMS standards, phone numbers are implemented as IP Multimedia Public Identities (IMPU). For example, the IMPU may be a phone number xxx-ABC-DEFG. The IMPU may not be unique for phone 330, however, the IMPI is unique for phone 330. Thus, multiple user equipment may have the same IMPU and a device may have multiple IMPUs, and the IMPUs are assigned to the IMPIs. This allows two or more subscriber's user equipment to use a shared telephone number (e.g. two mobile telephones shared by family members), and further allows one telephone to have multiple telephone numbers (e.g. a subscriber may have a personal and work phone number). When a phone 330 registers with IMS network 300 and provides private user ID 313, IMS network 300 may use private user ID 313 to implicitly register for phone 330 any public user IDs associated with private user ID 313.

Figure 4:
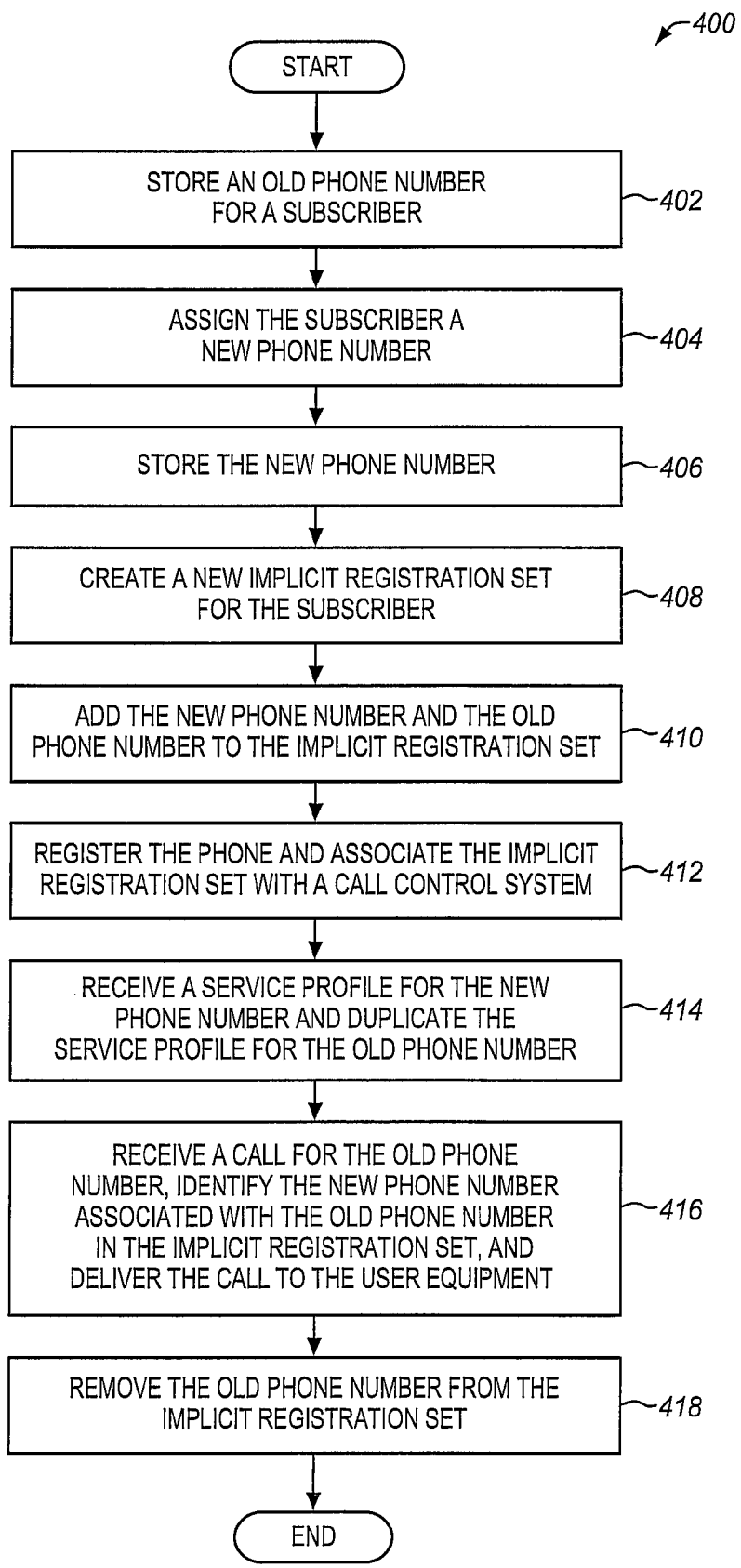
FIG. 4 illustrates a method of operating an IMS network implementing a split numbering plan area code in another exemplary embodiment of the invention.

FIG. 4 illustrates a method 400 for implementing a split numbering plan area code in an IMS network in an exemplary embodiment of the invention. The steps of method 400 will be described with reference to IMS network 300 illustrated in FIG. 3. The steps of method 400 are not all inclusive, and may include other steps not shown.

In step 402, HSS 305 stores an old phone number 312 and a private user ID 313 for a subscriber. For example, old phone number 312 and private user ID 313 may be stored in a record on HSS 305. Old phone number 312 includes an old area code used prior to the split numbering plan area code. Private user ID 313 corresponds to a user identity of the subscriber assigned by IMS network 300 for identifying a phone 330 of the subscriber to IMS network 300. For example, private user ID 313 may be stored on a memory card of the phone 330, and phone 330 may transmit private user ID 313 to CSCF 320 for registration with IMS network 300.

In step 404, IMS network 300 assigns the subscriber a new phone number 311 for phone 330. New phone number 311 for the subscriber includes a new area code assigned as a result of the split numbering plan area code. In step 406, HSS 305 stores new phone number 311. For example, new phone number 311 may be stored in another record on HSS 305.

In step 408, HSS 305 creates a new implicit registration set 310 for the subscriber. If the subscriber has an existing implicit registration set 310 including old phone number 312, then HSS 305 may not need to create a new implicit registration set 310 for the subscriber, and may use the existing implicit registration set 310. For instance, if the subscriber already has multiple phone numbers associated with phone 330, such as a personal phone number and a work phone number, then the existing implicit registration set 310 may be used.

In step 410, HSS 305 adds new phone number 311 for the subscriber and old phone number 312 for the subscriber to implicit registration set 310 and associates new phone number 311 with private user ID 313. For example, old phone number 312 and new phone number 311 may comprise records stored on HSS 305, and a field in the records may link the record to implicit registration set 310.

In step 412, CSCF 320 registers phone 330 with HSS 305. HSS 305 associates implicit registration set 310 with CSCF 320. For example, HSS 305 may update a record in a database for implicit registration set 310 to reflect that phone 320 is presently served by CSCF 320. HSS 305 further notifies CSCF 320 of the implicit registration of old phone number 312 with new phone number 311. When phone 330 with new phone number 311 is registered, HSS 305 retrieves the record for new phone number 311. HSS 305 may automatically be able to retrieve any related numbers in implicit registration set 310 using the link in the record as previously described, and associate all of the phone numbers in implicit registration set 310 with phone 330. Thus, the calls to old phone number 312 and new phone number 311 will be routed through CSCF 320.

In step 414, CSCF 320 receives a service profile from HSS 305 for new phone number 311, and duplicates the service profile for old phone number 312. Thus, old phone number 312 and new phone number 311 may have the same service profile.

In step 416, CSCF 320 receives a call for old phone number 312, identifies new phone number 311 associated with old phone number 312 in implicit registration set 310, and delivers the call to phone 330.

In step 418, HSS 305 removes old phone number 312 from implicit registration set 310 after a predetermined time. The predetermined time may be for example, the grace period mandated by the FCC for call forwarding after a split numbering plan area code. Once old phone number 312 is removed from implicit registration set 310, callers may no longer access the subscriber using old phone number 312.

An example is provided to illustrate the operation of method 400. Assume that a subscriber is assigned an old phone number 312 (xxx-ABC-DEFG), which is stored on HSS 305. IMS network 300 implements a split numbering plan area code, which results in assigning the subscriber with a new phone number 311, (xx1-ABC-DEFG). HSS 305 creates a new record for new phone number 311. HSS 305 further creates a new implicit registration set 310 for the subscriber, and links new phone number 311 and old phone number 312 with the new implicit registration set 310. Thereafter, CSCF 320 registers phone 330 of the subscriber when phone 330 provides private user ID 313 to HSS 305, and HSS 305 associates old phone number 312 and new phone number 311 with private user ID 313 in implicit registration set 310. CSCF 320 is further associated with implicit registration set 310. CSCF 320 receives a service profile for old phone number 312, and duplicates the service profile for new phone number 311. For example, CSCF 320 may create a new service profile for old phone number 312 by copying the fields of the service profile for new phone number 311, and changing the phone number field for the service profile of old phone number 312. Thus, phone 330 has two matching service profiles loaded on CSCF 320.

Calling device 340 places a call to old phone number 312, and the call is routed through CSCF 350. CSCF 350 contacts HSS 305 to determine the network location of phone 330 associated with old phone number 312. HSS 305 informs CSCF 350 that phone 330 is served by CSCF 320. The call is routed from CSCF 350 to CSCF 320. CSCF 320 further identifies the destination of the call as phone 330 assigned private user ID 313, and delivers the call to phone 330. After the FCC grace period ends, HSS 305 removes the record for old phone number 312 from implicit registration set 310 of the subscriber and callers may no longer access the subscriber through the old phone number 312.

Although specific embodiments were described herein, the scope of the invention is not limited to those specific embodiments. The scope of the invention is defined by the following claims and any equivalents thereof.

We claim:

1. An IMS network implementing a split numbering plan area code, the IMS network comprising:
    a subscriber server adapted to store a new phone number including a new area code for a subscriber assigned as a result of the split numbering plan area code; and
    a call control system coupled to the subscriber server adapted to register user equipment of the subscriber assigned the new phone number with the subscriber server, further adapted to associate an old phone number of the subscriber used prior to the split numbering plan area code with the new phone number in an implicit registration set, and further adapted to receive a call for the old phone number and identify the new phone number associated with the old phone number in the implicit registration set and to deliver the call to the user equipment.

2. The IMS network of claim 1 wherein the subscriber server is further adapted to remove the old phone number of the subscriber from the implicit registration set after a predetermined time.

3. The IMS network of claim 1 wherein the subscriber server is further adapted to add the new phone number to an existing implicit registration set comprising the old phone number.

4. The IMS network of claim 1 wherein the subscriber server is further adapted to create a new implicit registration set, and adapted to add the old phone number and the new phone number to the new implicit registration set.

5. The IMS network of claim 1 wherein the subscriber server comprises a home subscriber server (HSS).

6. The IMS network of claim 1 wherein the call control system comprises a Call Session Control Function (CSCF).

7. The IMS network of claim 1 wherein the new phone number is associated with a service profile, and the call control system is further adapted to receive the service profile from the subscriber server, and further adapted to duplicate the service profile for the old phone number.

8. A method for implementing a split numbering plan area code on an IMS network, the method comprising:
    assigning a new phone number including a new area code for a subscriber as a result of the split numbering plan area code;
    registering user equipment of the subscriber assigned the new phone number with a subscriber server;
    associating an old phone number of the subscriber used prior to the split numbering plan area code with the new phone number in an implicit registration set;
    receiving a call for the old phone number and identifying the new phone number associated with the old phone number in the implicit registration set; and
    delivering the call to the user equipment.

9. The method of claim 8 further comprising removing the old phone number of the subscriber from the implicit registration set after a predetermined time.

10. The method of claim 8 further comprising adding the new phone number to an existing implicit registration set comprising the old phone number.

11. The method of claim 8 further comprising:
    creating a new implicit registration set; and
    adding the old phone number and the new phone number to the new implicit registration set.

12. The method of claim 8 wherein the subscriber server comprises a home subscriber server (HSS).

13. The method of claim 8 further comprising duplicating a service profile associated with the new phone number for the old phone number.

14. An IMS network implementing a split numbering plan area code, the IMS network comprising:
    a subscriber server adapted to store an old phone number and a private user ID for the subscriber, wherein the old phone number includes an old area code used prior to the split numbering plan area code, and wherein the private user ID corresponds to a user identity of the subscriber assigned by the IMS network for identifying user equipment of the subscriber to the IMS network, and further adapted to store a new phone number for the subscriber assigned to the user equipment, wherein the new phone number includes a new area code for the subscriber assigned as a result of the split numbering plan area code, and wherein the new phone number is associated with the old phone number and the private user ID in an implicit registration set; and
    a call control system adapted to register the user equipment and associate the implicit registration set with the call control system on the subscriber server, and further adapted to receive a call for the old phone number and identify the new phone number associated with the old phone number in the implicit registration set and to deliver the call to the user equipment.

15. The IMS network of claim 14 wherein the subscriber server is further adapted to remove the old phone number from the implicit registration set after a predetermined time.

16. The IMS network of claim 14 wherein the subscriber server comprises a home subscriber server (HSS).

17. The IMS network of claim 14 wherein the call control system comprises a Call Session Control Function (CSCF).

18. The IMS network of claim 14 wherein the new phone number is associated with a service profile, and the call control system is further adapted to receive the service profile from the subscriber server, and further adapted to duplicate the service profile for the old phone number.

19. The IMS network of claim 14 wherein the subscriber server is further adapted to add the new phone number to an existing implicit registration set comprising the old phone number.

20. The IMS network of claim 14 wherein the subscriber server is further adapted to create a new implicit registration set, and adapted to add the old phone number and the new phone number to the new implicit registration set.

* * * * *